United States Patent
Momoeda (10) Patent No.: US 11,981,016 B2
(45) Date of Patent: May 14, 2024

(54) ELECTRIC TOOL

(71) Applicant: Panasonic Intellectual Property Management Co., Ltd., Osaka (JP)

(72) Inventor: Kotaro Momoeda, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 206 days.

(21) Appl. No.: 17/637,902

(22) PCT Filed: Jun. 19, 2020

(86) PCT No.: PCT/JP2020/024211
§ 371 (c)(1),
(2) Date: Feb. 24, 2022

(87) PCT Pub. No.: WO2021/039054
PCT Pub. Date: Mar. 4, 2021

(65) Prior Publication Data
US 2022/0274245 A1  Sep. 1, 2022

(30) Foreign Application Priority Data

Aug. 30, 2019 (JP) ................. 2019-159081

(51) Int. Cl.
*B25F 5/00* (2006.01)
*B25B 23/147* (2006.01)
*H02P 21/26* (2016.01)

(52) U.S. Cl.
CPC .............. *B25F 5/001* (2013.01); *H02P 21/26* (2016.02); *B25B 23/147* (2013.01)

(58) Field of Classification Search
CPC .... B25F 5/001; B25F 5/00; B25F 3/00; H02P 21/24; H02P 21/26; H02P 21/28
See application file for complete search history.

(56) References Cited

U.S. PATENT DOCUMENTS 9,088,239 B2   7/2015 Kaizo et al.
2010/0307782 A1* 12/2010 Iwata ................. H02P 29/0241
173/217

(Continued)

FOREIGN PATENT DOCUMENTS

EP   2 708 329 A1   3/2014
JP   H06-133409 A   5/1994

(Continued)

OTHER PUBLICATIONS

Ebimoto, Machine Translation of JP 2011-050150 A, Mar. 2011 (Year: 2023).*

(Continued)

*Primary Examiner* — Veronica Martin
(74) *Attorney, Agent, or Firm* — Rimon P.C.

(57) ABSTRACT

In an electric tool, a motor has a permanent magnet and a coil. An operating member receives an operating command. A control unit performs driving control on the motor in accordance with the operating command. A transmission mechanism transmits motive power of the motor to an output shaft. A switching mechanism switches an operation mode of the electric tool from a first mode to a second mode, or vice versa. Magnitude of variation in a rotational speed of the output shaft in response to a change by a unit quantity in an output torque of the output shaft is smaller in the first mode than in the second mode. The control unit can perform, in the first mode, flux weakening control that causes a flux weakening current to flow through the coil to make the coil generate a magnetic flux that weakens a magnetic flux of the permanent magnet.

8 Claims, 7 Drawing Sheets

(56) References Cited

U.S. PATENT DOCUMENTS

2012/0223663 A1   9/2012 Dietl et al.
2017/0106520 A1   4/2017 Schadow et al.

FOREIGN PATENT DOCUMENTS

| JP | 2008-312298 A | | 12/2008 |
| --- | --- | --- | --- |
| JP | 2011-050150 A | | 3/2011 |
| JP | 2011050150 A | * | 3/2011 |
| JP | 2012-200073 A | | 10/2012 |
| JP | 2013-106480 A | | 5/2013 |
| JP | 2014-023212 A | | 2/2014 |
| JP | 2014-054707 A | | 3/2014 |
| JP | 2017-526539 A | | 9/2017 |

OTHER PUBLICATIONS

International Search Report and Written Opinion issued in International Patent Application No. PCT/JP2020/024211, dated Aug. 18, 2020; with partial English translation.
Extended European Search Report dated Sep. 14, 2022 issued in the corresponding European Patent Application No. 20856190.2.

* cited by examiner

ELECTRIC TOOL

CROSS-REFERENCE OF RELATED APPLICATIONS

This application is the U.S. National Phase under 35 U.S.C. § 371 of International Patent Application No. PCT/JP2020/024211, filed on Jun. 19, 2020, which in turn claims the benefit of Japanese Application No. 2019-159081, filed on Aug. 30, 2019, the entire disclosures of which Applications are incorporated by reference herein.

TECHNICAL FIELD

The present disclosure generally relates to an electric tool, and more particularly relates to an electric tool including a motor with a permanent magnet and a coil.

BACKGROUND ART

Patent Literature 1 discloses an electric tool. The electric tool includes: a motor to be driven with driving power supplied from a battery pack; a power transmission unit for reducing the rotational speed of the motor and outputting rotational power of the motor with the rotational speed thus reduced; and a control unit for performing comprehensive control over the electric tool including the motor.

The power transmission unit reduces the rotational speed of the motor and outputs rotational power of the motor with the rotational speed thus reduced to an output shaft. The power transmission unit includes two speed reducer gears (an "H gear" and an "L gear," respectively). The power transmission unit is configured to change a reduction ratio in two stages by moving a ring gear, serving as a switching member, along the axis of an output shaft and bringing the ring gear into engagement with any of the speed reducer gears.

CITATION LIST

Patent Literature

Patent Literature 1: JP 2014-054707 A

SUMMARY OF INVENTION

An object of the present disclosure is to provide an electric tool contributing to having machining work done more efficiently using the tool.

An electric tool according to an aspect of the present disclosure includes a motor, an operating member, a control unit, a transmission mechanism, and a switching mechanism. The motor has a permanent magnet and a coil. The operating member receives an operating command entered by a user. The control unit performs driving control on the motor in accordance with the operating command entered through the operating member. The transmission mechanism transmits motive power of the motor to an output shaft. The switching mechanism switches an operation mode of the electric tool from a first mode to a second mode, or vice versa. In the first mode, magnitude of a variation in a rotational speed of the output shaft in response to a change by unit quantity in an output torque of the output shaft is smaller than in the second mode. The control unit has capability of performing flux weakening control in the first mode. The flux weakening control causes a flux weakening current to flow through the coil to make the coil generate a magnetic flux that weakens a magnetic flux of the permanent magnet.

DESCRIPTION OF EMBODIMENTS

An electric tool 100 according to an exemplary embodiment will be described with reference to the accompanying drawings.

(1) Overview

Figure 1:
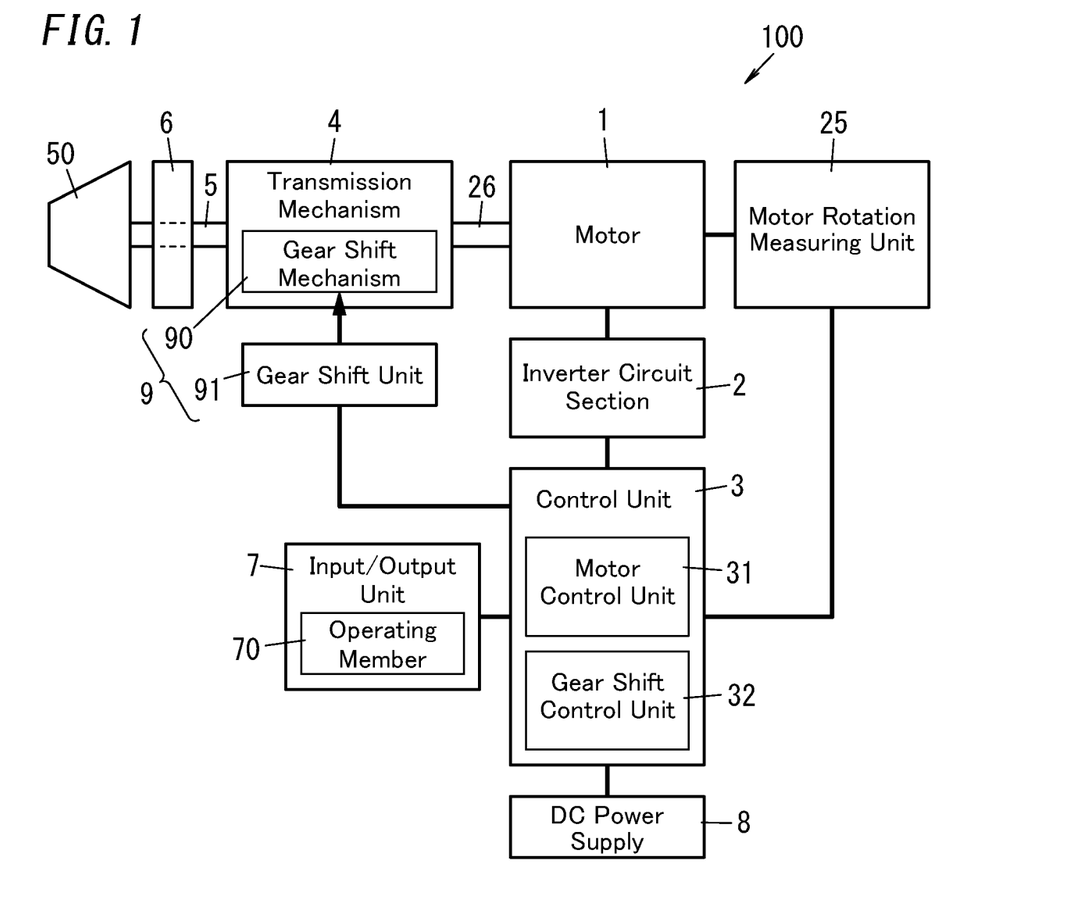
FIG. 1 is a block diagram of an electric tool according to an exemplary embodiment.

FIG. 1 is a block diagram illustrating a schematic configuration for an electric tool 100 according to an exemplary embodiment. The electric tool 100 according to this embodiment includes a motor 1, a control unit 3, a transmission mechanism 4, an output shaft 5, an operating member 70, and a switching mechanism 9.

Figure 2:
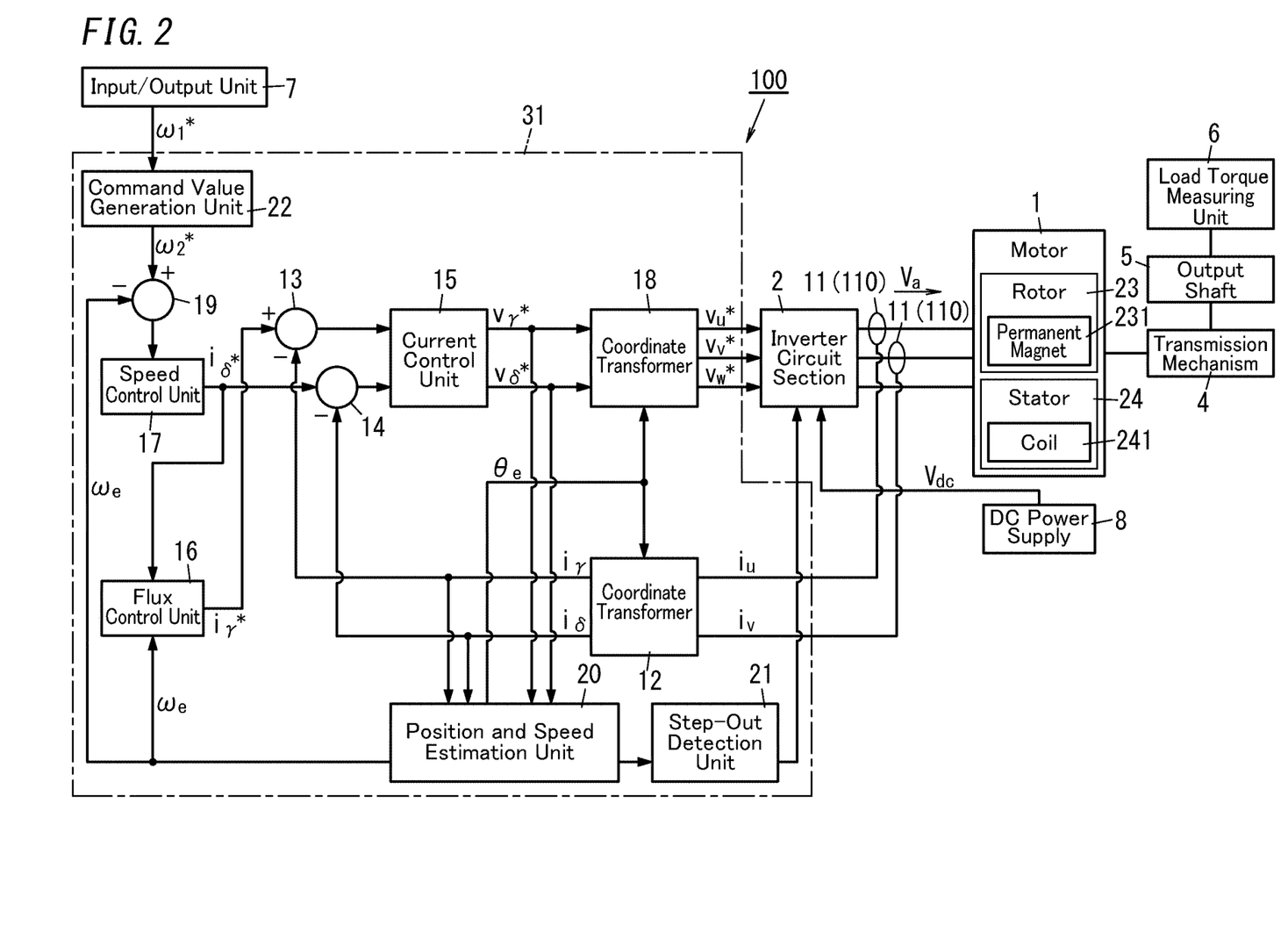
FIG. 2 is a block diagram showing a detailed configuration of a control unit included in the electric tool.

The motor 1 may be a brushless motor, for example. In particular, the motor 1 according to this embodiment is a synchronous motor. More specifically, the motor 1 may be implemented as a permanent magnet synchronous motor (PMSM). As shown in FIG. 2, the motor 1 includes a rotor 23 having a permanent magnet 231 and a stator 24 having a coil 241. The rotor 23 includes a rotary shaft 26 (see FIG. 1). The rotor 23 rotates with respect to the stator 24 due to electromagnetic interaction between the coil 241 and the permanent magnet 231.

The output shaft 5 is a part to rotate with the motive power of the motor 1. A tip tool may be attached to the output shaft 5 via a chuck 50, for example.

The transmission mechanism 4 is provided between the rotary shaft 26 of the motor 1 and the output shaft 5. The transmission mechanism 4 transmits the motive power of the motor 1 to the output shaft 5.

The switching mechanism 9 switches the operation mode of the electric tool 100 from a first mode to a second mode, or vice versa. In the first mode, the magnitude of variation in the rotational speed of the output shaft 5 in response to a change in the output torque of the output shaft 5 is relatively small. In the second mode, the magnitude of variation in the rotational speed of the output shaft 5 in response to a change in the output torque of the output shaft 5 is relatively large.

More specifically, the switching mechanism 9 includes a gear shift mechanism 90. The gear shift mechanism 90 is provided for the transmission mechanism 4 and is disposed between the motor 1 and the output shaft 5. The gear shift mechanism 90 reduces the rotational speed of the rotary shaft 26 of the motor 1 and transmits rotational power of the rotary shaft 26 with the rotational speed thus reduced to the output shaft 5. The gear shift mechanism 90 is configured to change the reduction ratio (gear ratio) that is the ratio of the rotational speed of the output shaft 5 to the rotational speed of the rotary shaft 26. In the electric tool 100, as the reduction ratio is changed by the gear shift mechanism 90, the output torque of the output shaft 5 also changes accordingly.

Figure 7:
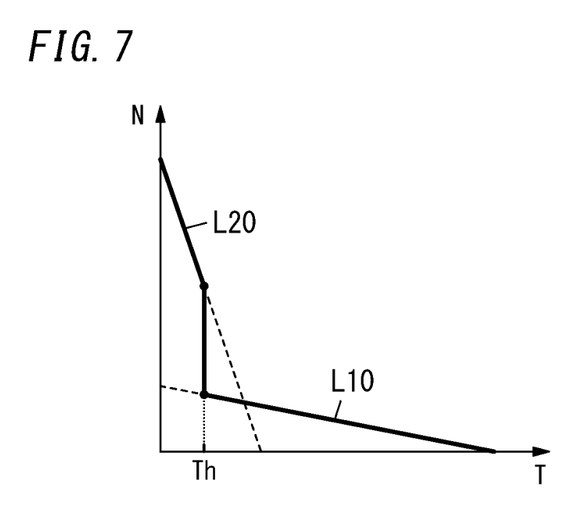
FIG. 7 shows a relationship between the output torque of an output shaft and the rotational speed of the output shaft in an electric tool according to a comparative example.

FIG. 7 shows an exemplary characteristic between the output torque T of the output shaft 5 and the rotational speed (number of revolutions) N of the output shaft 5 (hereinafter referred to as a "TN characteristic") in a situation where the reduction ratio is changed by the gear shift mechanism 90. In FIG. 7, the line L10 shows the TN characteristic in a state where the difference between the rotational speed of the motor 1 and the rotational speed of the output shaft 5 is relatively large (i.e., a state with the larger reduction ratio; a state where a so-called "low-speed gear" is used). On the other hand, the line L20 shows the TN characteristic in a state where the difference between the rotational speed of the motor 1 and the rotational speed of the output shaft 5 is relatively small (i.e., a state with the smaller reduction ratio; a state where a so-called "high-speed gear" is used). In the example illustrated in FIG. 7, the reduction ratio is changed when the output torque of the output shaft 5 is equal to a threshold value Th.

In the electric tool 100 according to this embodiment, a change of the reduction ratio by the gear shift mechanism 90 corresponds to a switch of the operation mode. That is to say, in the electric tool 100, when the reduction ratio is changed by the gear shift mechanism 90, the operation mode switches from the first mode to the second mode, or vice versa. Specifically, a state with the larger reduction ratio (as indicated by the line L10 in FIG. 7) corresponds to the first mode of the electric tool 100 and a state with the smaller reduction ratio (as indicated by the line L20 in FIG. 7) corresponds to the second mode of the electric tool 100. That is to say, the first mode is an operation mode in which the rotational speed of the output shaft 5 is relatively low and the second mode is an operation mode in which the rotational speed of the output shaft 5 is relatively high. As shown in FIG. 7, the magnitude of variation in the rotational speed N of the output shaft 5 in response to a change by a unit quality in the output torque T of the output shaft 5 is smaller in the first mode than in the second mode.

The operating member 70 receives an operating command entered by the user.

In accordance with the operating command entered through the operating member 70, the control unit 3 performs driving control, as vector control, on the motor 1.

The control unit 3 has the capability of performing flux weakening control in the first mode (i.e., the state with the larger reduction ratio). The control unit 3 performs the flux weakening control that causes a flux weakening current to flow through the coil 241 to make the coil 241 generate a magnetic flux that weakens a magnetic flux of the permanent magnet 231.

As a motor 1 such as a permanent magnet synchronous motor is driven, an induced voltage proportional to the rotational speed is generated in the motor 1. When the induced voltage becomes equal to the voltage of a power supply, no current may flow through the motor 1 any longer, and therefore, the rotational speed of the motor 1 cannot be increased anymore. In the flux weaking control, causing a flux weaking current to flow through the coil 241 allows the induced voltage generated in the motor 1 to be reduced, thus enabling increasing the rotational speed of the motor 1.

Thus, the electric tool 100 according to this embodiment enables increasing the rotational speed of the output shaft 5 by increasing the rotational speed of the motor 1 (i.e., the rotational speed of the rotary shaft 26) in the first mode. This contributes to having machining work done more efficiently by using the tool.

(2) Details

Next, the electric tool 100 according to this embodiment will be described in further detail with reference to the accompanying drawings.

As shown in FIGS. 1 and 2, the electric tool 100 according to this embodiment includes the motor 1, an inverter circuit section 2, the control unit 3, the transmission mechanism 4, the output shaft 5, a load torque measuring unit 6, an input/output unit 7, a DC power supply 8, the switching mechanism 9, and a current measuring unit 110.

In this embodiment, the motor 1 is a synchronous motor as described above. As shown in FIG. 2, the motor 1 includes the rotor 23 including the permanent magnet 231 and the stator 24 including the coil 241.

The DC power supply 8 is a power supply for use to drive the motor 1. In this embodiment, the DC power supply 8 includes a secondary battery. The DC power supply 8 is a so-called "battery pack." The DC power supply 8 may also be used as a power supply for the inverter circuit section 2 and the control unit 3.

The inverter circuit section 2 is a circuit for driving the motor 1. The inverter circuit section 2 converts a voltage $V_{dc}$ supplied from the DC power supply 8 to a drive voltage $V_a$ for the motor 1. In this embodiment, the drive voltage $V_a$ is a three-phase AC voltage including a U-phase voltage, a V-phase voltage, and a W-phase voltage. In the following description, the U-, V-, and W-phase voltages will be hereinafter designated by $v_u$, $v_v$, and $v_w$, respectively, as needed. These voltages $v_u$, $v_v$, and $v_w$ are sinusoidal voltages.

The inverter circuit section 2 may be implemented as a combination of a PWM inverter and a PWM converter. The PWM converter generates a pulse-width modulated PWM signal in accordance with target values (voltage command values) $v_u^*$, $v_v^*$, $v_w^*$ of the drive voltage $V_a$ (including the U-phase voltage $v_u$, the V-phase voltage $v_v$, and the W-phase voltage $v_w$). The PWM inverter applies a drive voltage $V_a$ ($v_u$, $v_v$, $v_w$) corresponding to the PWM signal to the motor 1, thereby driving the motor 1. More specifically, the PWM inverter includes half-bridge circuits corresponding to the three phases and a driver. In the PWM inverter, the driver turns ON and OFF a switching element in each half-bridge circuit in response to the PWM signal, thereby applying the drive voltage $V_a$ ($v_u$, $v_v$, $v_w$) according to the voltage command values $v_u^*$, $v_v^*$, $v_w^*$ to the motor 1. As a result, the motor 1 is supplied with a drive current corresponding to the drive voltage $V_a$ ($v_u$, $v_v$, $v_w$). The drive current includes a U-phase current $i_u$, a V-phase current $i_v$, and a W-phase current $i_w$. More specifically, the U-phase current $i_u$, the V-phase current $i_v$, and the W-phase current $i_w$ are respectively a current flowing through U-phase armature winding, a current flowing through V-phase armature winding, and a current flowing through W-phase armature winding in the stator 24 of the motor 1.

The current measuring unit 110 includes two phase current sensors 11. The two phase current sensors 11 respectively measure the U-phase current $i_u$ and the V-phase current $i_v$ out of the drive current supplied from the inverter circuit section 2 to the motor 1. Note that the W-phase current $i_w$ may be obtained based on the U-phase current $i_u$ and the V-phase current $i_v$. Alternatively, the current measuring unit 110 may include a current detector that uses a shunt resistor, for example, instead of the phase current sensors 11.

The transmission mechanism 4 is provided between the motor 1 and the output shaft 5. The transmission mechanism 4 transmits the motive power of the motor 1 to the output shaft 5.

As described above, in the electric tool 100 according to this embodiment, the transmission mechanism 4 includes the gear shift mechanism 90. The output shaft 5 is coupled to the rotary shaft 26 (rotor 23) of the motor 1 via the gear shift mechanism 90. The chuck 50 is joined to the output shaft 5. To the chuck 50, a tip tool such as a drill bit or a screwdriver bit may be attached removably. This allows the transmission mechanism 4 to transmit the motive power of the motor 1 to the tip tool to drive the tip tool.

The gear shift mechanism 90 reduces the rotational speed of the rotary shaft 26 of the motor 1 and then transmits the rotational power of the rotary shaft 26 with the rotational speed thus reduced to the output shaft 5. The gear shift mechanism 90 is configured to readily change the reduction ratio that is the ratio of the rotational speed of the output shaft 5 to the rotational speed of the rotary shaft 26. The reduction ratio of the gear shift mechanism 90 may be changed by having a gear shift unit 91 controlled by the control unit 3.

Figure 3:
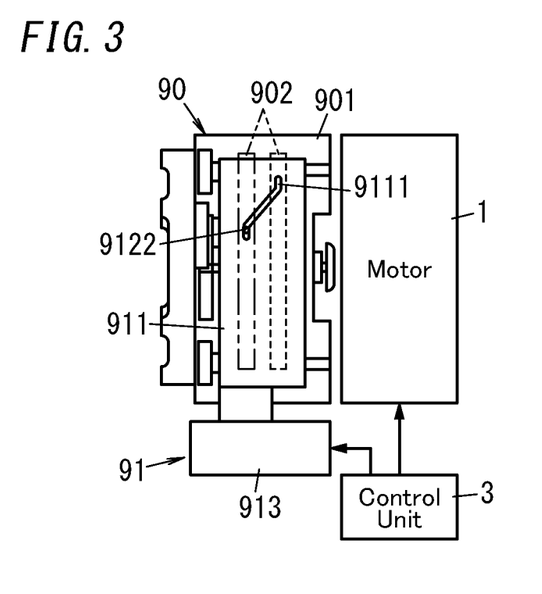
FIG. 3 schematically illustrates the configuration of a principal part, including a gear shift mechanism, of the electric tool.
Figure 4:
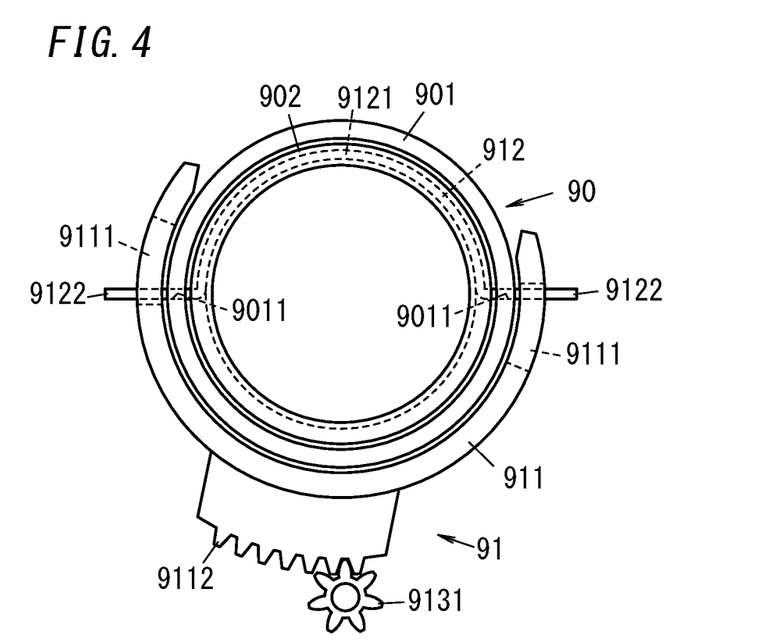
FIG. 4 is a front view illustrating the gear shift mechanism of the electric tool.

As shown in FIGS. 3 and 4, the gear shift mechanism 90 includes a gear case 901, a ring gear 902, and two speed reducer gears (not shown; hereinafter referred to as an "L gear" and "H gear," respectively).

The gear case 901 is formed in a circular cylindrical shape. The side surfaces (i.e., the right and left side surfaces in FIG. 4) of the gear case 901 have a pair of elongate holes 9011 extending along the axis of the gear case 901 (i.e., perpendicularly to the paper on which FIG. 4 is drawn).

The ring gear 902 has an annular shape. The ring gear 902 is housed in the gear case 901 such that the axis of the ring gear 902 is aligned with the axis of gear case 901. The ring gear 902 is movable axially (i.e., in the rightward/leftward direction in FIG. 3) inside the gear case 901 between a first position (i.e., a position more distant from the motor 1) indicated by the two-dot chain in FIG. 3 and a second position (i.e., a position closer to the motor 1) indicated by the dashed line in FIG. 3. The ring gear 902 has internal teeth to mesh with the external teeth of the two speed reducer gears.

The two speed reducer gears are housed in the gear case 901. The two speed reducer gears are arranged side by side along the axis of the ring gear 902 (i.e., in the rightward/leftward direction shown in FIG. 3) inside the gear case. Each of the two speed reducer gears includes a planetary gear mechanism including a sun gear and a plurality of planetary gears, for example. The two speed reducer gears are arranged such that one of the two speed reducer gears selectively meshes with the ring gear 902 as the ring gear 902 moves axially. The L gear out of the two speed reducer gears meshes with the ring gear 902 when the ring gear 902 is located at the first position (i.e., the position indicated by the two-dot chain in FIG. 3). The H gear out of the two speed reducer gears meshes with the ring gear 902 when the ring gear 902 is located at the second position (i.e., the position indicated by the dashed line in FIG. 3).

The two speed reducer gears have mutually different reduction ratios when meshing with the ring gear 902. Thus, the reduction ratio may be changed in two stages by moving the ring gear 902 axially to bring the internal teeth of the ring gear 902 into engagement with the external teeth of any one of the two speed reducer gears.

The gear shift unit 91 changes the reduction ratio of the gear shift mechanism 90 under the control of the control unit 3 (i.e., a gear shift control unit 32 to be described later). The gear shift unit 91 changes the reduction ratio of the gear shift mechanism 90 by moving the ring gear 902. As shown in FIGS. 3 and 4, the gear shift unit 91 includes a cam member 911, a supporting member 912, and a gear shift actuator 913.

The cam member 911 has an arc-shaped cross section (i.e., the shape of a semi-cylinder, of which the upper part is cut out in FIGS. 3 and 4). The cam member 911 is disposed outside of the gear case 901 concentrically with the gear case 901. On the side surfaces of the cam member 911 (i.e., on the front and rear side surfaces in FIG. 3 and the right and left side surfaces in FIG. 4), provided are a pair of cam holes 9111. Each of the cam holes 9111 has an actuating hole portion extending obliquely with respect to the axis and circumference of the cam member 911 and a pair of holding hole portions provided at both ends of the actuating hole portion continuously with the actuating hole portion and extending along the circumference of the cam member 911. The cam member 911 is disposed outside of the gear case 901 such that the pair of cam holes 9111 of the cam member 911 face the pair of elongate holes 9011 of the gear case 901.

As shown in FIG. 4, the outer peripheral surface of the ring gear 902 has an annular groove extending along the circumference of the ring gear 902. The supporting member 912 made of a metallic wire material is put in the groove. The supporting member 912 includes: a semi-arc-shaped supporting portion 9121 aligned with the bottom of the groove of the ring gear 902; and a pair of protruding portions 9122 extended linearly from both ends of the supporting portion 9121 and radially outward with respect to the supporting portion 9121. Each of the pair of protruding portions 9122 is passed through a corresponding elongate hole 9011 of the gear case 901 and a corresponding cam hole 9111 of the cam member 911 (see FIGS. 3 and 4).

The gear shift actuator 913 includes a motor (sub-motor) and a gear 9131. In the gear shift actuator 913, the gear 9131 is coupled to the rotary shaft of the motor. The operation of the gear shift actuator 913 (the operation of the motor) is controlled by the control unit 3 (gear shift control unit 32).

At the bottom of the cam member 911, provided are teeth 9112 meshing with the gear 9131 of the gear shift actuator 913. As the motor of the gear shift actuator 913 rotates in the forward or backward direction, the cam member 911 rotates (either clockwise or counterclockwise in FIG. 4) around its axis in synch with the rotation of the gear 9131. As the cam member 911 rotates, the protruding portions 9122 of the supporting member 912 move inside the elongate holes 9011 and the cam holes 9111. As the protruding portions 9122 move inside the actuating hole portions of the cam holes 9111, the ring gear 902 moves along its axis (i.e., in the rightward/leftward direction in FIG. 3) between the first position and the second position.

As described above, in the electric tool 100 according to this embodiment, the ring gear 902 meshes with the L gear at the first position (i.e., a position more distant from the motor 1). When the ring gear 902 meshes with the L gear, the reduction ratio of the gear shift mechanism 90 becomes relatively large (i.e., the rotational speed of the output shaft 5 becomes relatively low) to turn the operation mode of the electric tool 100 to the first mode. On the other hand, the ring gear 902 meshes with the H gear at the second position (i.e., a position closer to the motor 1). When the ring gear 902 meshes with the H gear, the reduction ratio of the gear shift mechanism 90 becomes relatively small (i.e., the rotational speed of the output shaft 5 becomes relatively high) to turn the operation mode of the electric tool 100 to the second mode.

That is to say, in the electric tool 100 according to this embodiment, the gear shift mechanism 90 and the gear shift unit 91 form the switching mechanism 9 for switching the operation mode of the electric tool 100 from the first mode to the second mode, or vice versa.

Note that the gear shift mechanism 90 and the gear shift unit 91 do not have to have the above-described structure but may also have any other known structure.

The load torque measuring unit 6 measures the load torque applied to the output shaft 5. In this embodiment, the load torque measuring unit 6 includes a magnetostrictive strain sensor. The magnetostrictive strain sensor makes a coil, which is disposed in the housing (non-rotating portion) of the electric tool 100, for example, detect a variation in permeability corresponding to the strain caused upon the application of a torque to the output shaft 5. The magnetostrictive strain sensor outputs a voltage signal proportional to the strain to the control unit 3.

The input/output unit 7 is a user interface. The input/output unit 7 includes devices (such as a display, an input device, and the operating member 70) for use to display information about the operation of the electric tool 100, enter settings about the operation of the electric tool 100, and operate the electric tool 100. In this embodiment, the input/output unit 7 has the capability of setting a target value $\omega_1^*$ of the speed of the motor 1.

In this embodiment, the input/output unit 7 includes the operating member 70 for receiving an operating command entered by the user. In this embodiment, the operating member 70 may be a trigger volume (trigger switch). The trigger volume is a type of push button switch. The trigger volume is a multi-stage switch or a continuously variable switch (variable resistor), of which an operating signal varies according to the manipulative variable (i.e., how deep the switch is pressed down). The input/output unit 7 determines the target value $\omega_1^*$ in response to the operating signal supplied from the trigger volume and provides the target value $\omega_1^*$ to the control unit 3 (i.e., the motor control unit 31 to be described later).

The control unit 3 may be implemented as, for example, a computer system including one or more processors (e.g., microprocessors) and one or more memories. That is to say, the functions of the control unit 3 are performed by making the at least one processor execute one or more programs stored in the one or more memories. The one or more programs may be stored in advance in the memory. Alternatively, the one or more programs may also be downloaded via a telecommunications line such as the Internet or distributed after having been stored in a non-transitory storage medium such as a memory card.

The control unit 3 includes the motor control unit 31 and the gear shift control unit 32. Note that the motor control unit 31 and the gear shift control unit 32 do not necessarily have substantive configurations but represent functions to be performed by the control unit 3.

The gear shift control unit 32 controls the operation of the gear shift unit 91 based on a result of measurement made by the load torque measuring unit 6. That is to say, the gear shift control unit 32 of the control unit 3 makes the switching mechanism 9 change the reduction ratio based on the result of measurement made by the load torque measuring unit 6.

The gear shift control unit 32 controls, when finding the load torque measured by the load torque measuring unit 6 smaller than a predetermined first threshold value Th1 (see FIG. 6) in the first mode, the motor of the gear shift unit 91, thereby changing a state where the ring gear 902 meshes with the L gear to a state where the ring gear 902 meshes with the H gear. As a result, the operation mode of the electric tool 100 is changed from the first mode to the second mode.

In addition, the gear shift control unit 32 also controls, when finding the load torque measured by the load torque measuring unit 6 larger than a predetermined second threshold value Th2 (see FIG. 6) in the second mode, the motor of the gear shift unit 91, thereby changing the state where the ring gear 902 meshes with the H gear to the state where the ring gear 902 meshes with the L gear. As a result, the operation mode of the electric tool 100 is changed from the second mode to the first mode.

In the electric tool 100 according to this embodiment, the first threshold value Th1 and the second threshold value Th2 are equal to each other. However, this is only an example and should not be construed as limiting. Alternatively, the first threshold value Th1 and the second threshold value Th2 may be different from each other.

In the electric tool 100 according to this embodiment, the first threshold value Th1 and the second threshold value Th2 (which will be hereinafter represented by the "first threshold value Th1" for the sake of simplicity) are determined to prevent the rotational speed of the output shaft 5 from changing steeply when the reduction ratio is changed. Specifically, in the electric tool 100, the first threshold value Th1 is determined such that the difference between a first rotational speed and a second rotational speed falls within a predetermined range. As used herein, the first rotational speed is the rotational speed of the output shaft 5 when the output torque of the output shaft 5 is the first threshold value Th1 in a situation where the electric tool 100 is operating in the first mode. The second rotational speed is the rotational speed of the output shaft 5 when the output torque of the output shaft 5 is the first threshold value Th1 in a situation where the electric tool 100 is operating in the second mode. That is to say, changing the reduction ratio when the output torque of the output shaft 5 is the first threshold value Th1 (or the second threshold value Th2) causes the rotational speed of the output shaft 5 to change from the first rotational speed to the second rotational speed (or from the second rotational speed to the first rotational speed). Thus, setting the first threshold value Th1 such that the difference between the first rotational speed and the second rotational speed falls within the predetermined range may reduce the chances of the rotational speed of the output shaft 5 changing steeply.

In short, the control unit 3 switches, (only) when the current output torque value of the output shaft 5 is a value at which the difference between the first rotational speed and the second rotational speed is equal to or less than the threshold value, the operation mode from the first mode to the second mode, or vice versa. The first rotational speed is the rotational speed of the output shaft 5 corresponding to the current value of the output torque in a situation where the electric tool 100 is operating in the first mode. The second rotational speed is the rotational speed of the output shaft 5 corresponding to the current value of the output torque in a situation where the electric tool 100 is operating in the second mode.

The motor control unit 31 controls the operation of the motor 1 by controlling the drive voltage $V_a$ supplied from the inverter circuit section 2 to the motor 1. The motor control unit 31 obtains a command value $\omega_2^*$ of the speed of the motor 1 based on the target value $\omega_1^*$ of the speed of the motor 1 provided by the input/output unit 7. In addition, the motor control unit 31 determines the target values (voltage command values) $v_u^*$, $v_v^*$, $v_w^*$ of the drive voltage $V_a$ such that the speed of the motor 1 agrees with the command value $\omega_2^*$ and provides the target values $v_u^*$, $v_v^*$, $v_w^*$ for the inverter circuit section 2.

Next, the motor control unit 31 will be described in further detail. The motor control unit 31 controls the motor 1 by vector control. The vector control is a type of motor control method in which a motor current is broken down into a current component (q-axis current) that generates a torque (rotational power) and a current component (d-axis current) that generates a magnetic flux and in which these current components are controlled independently of each other.

Figure 5:
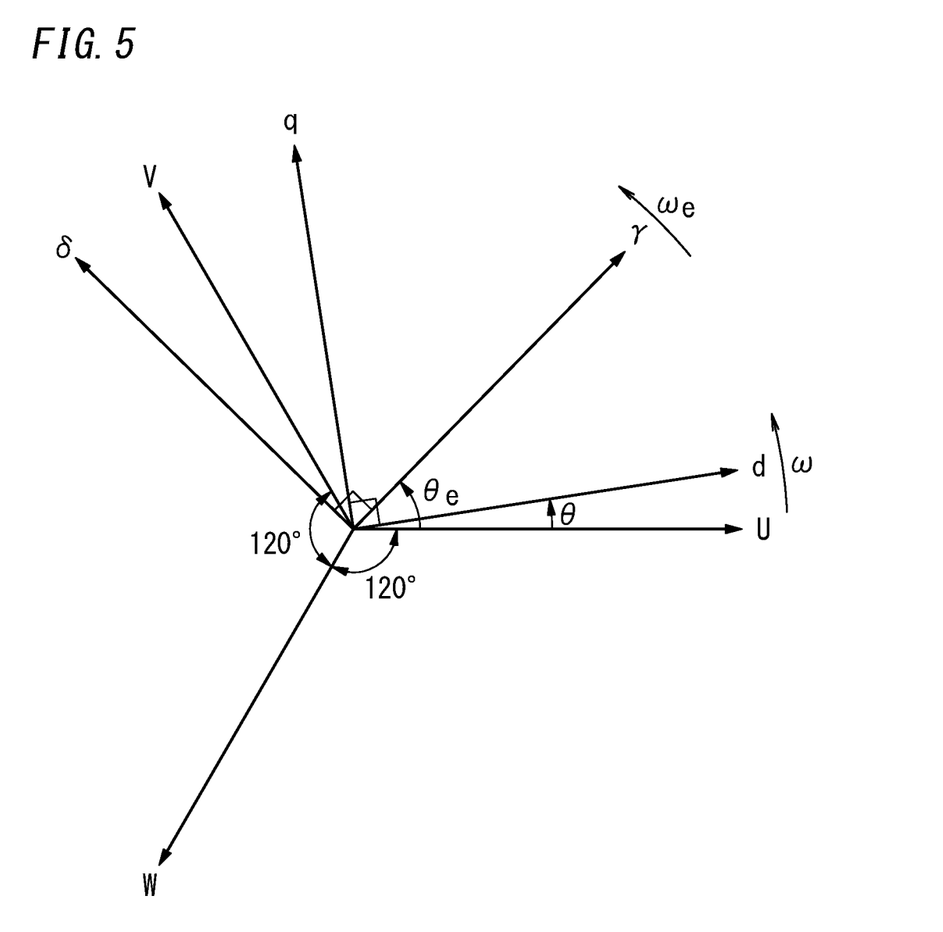
FIG. 5 illustrates how a motor control unit of the electric tool performs control.

FIG. 5 shows an analysis model of the motor 1 according to the vector control. In FIG. 5, shown are armature winding fixed axes for the U-, V-, and W-phases. According to the vector control, a rotational coordinate system rotating at the same rotational velocity as a magnetic flux generated by the permanent magnet 231 provided for the rotor 23 of the motor 1 is taken into account. In the rotational coordinate system, the direction of the magnetic flux generated by the permanent magnet 231 is defined by a d-axis and a rotational axis corresponding in control to the d-axis is defined by a γ-axis. A q-axis is set at a phase leading by an electrical angle of 90 degrees with respect to the d-axis. A δ-axis is set at a phase leading by an electrical angle of 90 degrees with respect to the γ-axis. The rotational coordinate system corresponding to real axes is a coordinate system, for which the d-axis and q-axis are selected as its coordinate axes (which will be hereinafter referred to as "dq axes"). The rotational coordinate system in control is a coordinate system, for which the γ-axis and δ-axis are selected as its coordinate axes (which will be hereinafter referred to as "γδ axes").

The dq axes have rotated and their rotational velocity is designated by $\omega$. The γδ axes have also rotated and their rotational velocity is designated by $\omega_e$. Also, in the dq axes, the d-axis angle (phase) as viewed from the U-phase armature winding fixed axis is designated by $\theta$. In the same way, in the γδ axes, the γ-axis angle (phase) as viewed from the U-phase armature winding fixed axis is designated by $\theta_e$. The angles designated by $\theta$ and $\theta_e$ are angles as electrical angles and are generally called "rotor positions" or "magnetic pole positions." The rotational velocities designated by $\omega$ and $\omega_e$ are angular velocities represented by electrical angles. In the following description, $\theta$ or $\theta_e$ will be hereinafter sometimes referred to as a "rotor position" and $\omega$ or $\omega_e$ will be hereinafter simply referred to as a "velocity." The velocity $\omega$ and the rotor position $\theta$ may be obtained based on, for example, a result of measurement made by the motor rotation measuring unit 25 (see FIG. 1) that measures the rotational angle of the motor 1 using either a photoelectric encoder or a magnetic encoder.

Basically, the motor control unit 31 performs the vector control such that $\theta$ and $\theta_e$ agree with each other. If $\theta$ and $\theta_e$ agree with each other, the d-axis and the q-axis agree with the γ-axis and the δ-axis, respectively. In the following description, the γ-axis component and δ-axis component of the drive voltage $V_a$ will be represented as needed by a γ-axis voltage $v_\gamma$ and a δ-axis voltage $v_\delta$, respectively, and the γ-axis component and δ-axis component of the drive current will be represented as needed by a γ-axis current $i_\gamma$ and a δ-axis current $i_\delta$, respectively.

Also, voltage command values representing the respective target values of the γ-axis voltage $v_\gamma$ and the δ-axis voltage $v_\delta$ will be represented by a γ-axis voltage command value $v_\gamma^*$ and a δ-axis voltage command value $v_\delta^*$, respectively.

Furthermore, current command values representing the respective target values of the γ-axis current $i_\gamma$ and the δ-axis current $i_\delta^*$ will be represented by a γ-axis current command value $i_\gamma^*$ and a δ-axis current command value $i_\delta^*$, respectively.

The motor control unit 31 performs the vector control to make the values of the γ-axis voltage $v_\gamma$ and δ-axis voltage $v_\delta$ follow the γ-axis voltage command value $v_\gamma^*$ and the δ-axis voltage command value $v_\delta^*$, respectively, and to make the values of the γ-axis current $i_\gamma$ and δ-axis current $i_\delta$ follow the γ-axis current command value $i_\gamma^*$ and the δ-axis current command value $i_\delta^*$, respectively.

The motor control unit 31 updates, at predetermined update intervals, the command values ($i_\gamma^*$, $i_\delta^*$, $v_\gamma^*$, $v_\delta^*$, $v_u^*$, $v_v^*$, and $v_w^*$) and state quantities ($i_u$, $i_v$, $i_\gamma$, $\theta_e$, and $\omega_e$) calculated (or detected) by itself.

The types of control performed by the motor control unit 31 include normal control and flux weakening control.

When performing the normal control, the motor control unit 31 allows no d-axis current to flow from the inverter circuit section 2 to the coil 241. On the other hand, when performing the flux weakening control, the motor control unit 31 allows a d-axis current to flow from the inverter circuit section 2 to the coil 241 of the motor 1. The direction of the d-axis current allowed to flow from the inverter circuit section 2 to the coil 241 in the flux weakening control is the direction in which a magnetic flux that weakens the magnetic flux of the permanent magnet 231 (i.e., a magnetic flux having such a direction as to cancel the magnetic flux of the permanent magnet 231) is generated by the coil 241. Thus, the d-axis current supplied from the inverter circuit section 2 to the coil 241 in the flux weakening control will be hereinafter referred to as a "flux weakening current."

If a predetermined switching condition is satisfied, the motor control unit 31 allows the flux weakening current to flow through the coil 241. In other words, if the switching condition is satisfied, then the type of control performed by the motor control unit 31 is the flux weakening control. The switching condition includes that the motor 1 be operating in a high-speed range in the first mode. The switching condition also includes that the value of the q-axis current be equal to or less than a predetermined threshold value.

As used herein, the situation where the "motor 1 is operating in a high-speed range" in the electric tool 100 according to this embodiment may refer to a situation where "the speed $\omega$ of the motor 1 is equal to or higher than a threshold speed." Alternatively, the situation where the "motor 1 is operating in a high-speed range" may also refer to a situation where "the speed $\omega$ of the motor 1 is equal to or higher than the threshold speed" and/or "the duty of the PWM control is equal to or greater than a duty threshold value." As used herein, the duty of the PWM control is a value obtained by dividing the ON period during one cycle of a PWM signal by the length of one cycle.

As shown in FIG. 2, the motor control unit 31 includes a coordinate transformer 12, a subtractor 13, another subtractor 14, a current control unit 15, a flux control unit 16, a speed control unit 17, another coordinate transformer 18, still another subtractor 19, a position and speed estimation unit 20, a step-out detection unit 21, and a command value generation unit 22. Note that the coordinate transformer 12, the subtractors 13, 14, 19, the current control unit 15, the flux control unit 16, the speed control unit 17, the coordinate transformer 18, the position and speed estimation unit 20, the step-out detection unit 21, and the command value generation unit 22 represent respective functions to be performed by the motor control unit 31. Thus, the respective constituent elements of the motor control unit 31 may freely use the respective values generated inside the motor control unit 31.

The command value generation unit 22 generates a command value $\omega_2^*$ of the speed of the motor 1. The command value generation unit 22 obtains the command value $\omega_2^*$ based on the target value $\omega_1^*$ provided by the input/output unit 7.

The coordinate transformer 12 performs, based on the rotor position $\theta_e$, coordinate transformation on the U-phase current $i_u$ and the V-phase current $i_v$ on the γδ axes, thereby calculating unit and outputting a γ-axis current $i_\gamma$ and a δ-axis current $i_\delta$. As used herein, the γ-axis current $i_\gamma$ is a type of excitation current corresponding to the d-axis current and hardly contributing to a torque. On the other hand, the δ-axis current $i_\delta$ is a current corresponding to the q-axis current and significantly contributing to a torque. The rotor position $\theta_e$ is calculated by the position and speed estimation unit 20.

The subtractor 19 refers to the speed $\omega_e$, and the command value $\omega_2^*$ and calculates a speed deviation $(\omega_2^* - \omega_e)$ between the speed $\omega_e$ and the command value $\omega_2^*$. The speed $\omega_e$ is calculated by the position and speed estimation unit 20.

The speed control unit 17 calculates a δ-axis current command value $i_\delta^*$ by proportional integral control, for example, such that the speed deviation $(\omega_2^* - \omega_e)$ converges toward zero and outputs the δ-axis current command value $i_\delta^*$ thus calculated.

The flux control unit 16 determines a γ-axis current command value $i_\gamma^*$ and outputs the γ-axis current command value $i_\gamma^*$ to the subtractor 13. The γ-axis current command value $i_\gamma^*$ may have any of various values according to the type of the vector control performed by the control unit 3 and the speed ω of the motor 1, for example.

If the type of control performed by the motor control unit 31 is normal control, the γ-axis current command value $i_\gamma^*$ generated by the flux control unit 16 is a command value to make the d-axis current equal to zero (i.e., to allow no d-axis current to flow). On the other hand, if the type of control performed by the motor control unit 31 is flux weaking control, then the flux control unit 16 determines (or adjusts) the γ-axis current command value $i_\gamma^*$ by reference to a data table, for example. In the data table, the γ-axis current command value $i_\gamma^*$ may be associated with the speed ω and the δ-axis current command value $i_\delta^*$, for example. Thus, when performing the flux weaking control, the motor control unit 31 of the control unit 3 changes the magnitude of the flux weaking current (d-axis current) according to the q-axis current (i.e., a current component that generates a torque) and the speed of the motor 1.

The subtractor 13 subtracts the γ-axis current $i_\gamma$ provided by the coordinate transformer 12 from the γ-axis current command value $i_\gamma^*$ provided by the flux control unit 16, thereby calculating a current error $(i_\gamma^* - i_\gamma)$. The subtractor 14 subtracts the δ-axis current $i_\delta$ provided by the coordinate transformer 12 from the value $i_\delta^*$ provided by the speed control unit 17, thereby calculating a current error $(i_\delta^* - i_\delta)$.

The current control unit 15 performs current feedback control by proportional integral control, for example, such that both the current errors $(i_\gamma^* - i_\gamma)$ and $(i_\delta^* - i_\delta)$ converge toward zero. In this case, the current control unit 15 calculates a γ-axis voltage command value $v_\gamma^*$ and a δ-axis voltage command value $v_\delta^*$ by using non-interference control to eliminate interference between the γ-axis and the δ-axis such that both $(i_\gamma^* - i_\gamma)$ and $(i_\delta^* - i_\delta)$ converge toward zero.

The coordinate transformer 18 performs, based on the rotor position $\theta_e$ provided by the position and speed estimation unit 20, coordinate transformation on the γ-axis voltage command value $v_\gamma^*$ and a δ-axis voltage command value $v_\delta^*$ provided by the current control unit 15 on three-phase fixed coordinate axes, thereby calculating and outputting voltage command values ($v_u^*$, $v_v^*$, and $v_w^*$).

The position and speed estimation unit 20 estimates the rotor position $\theta_e$ and the speed $\omega_e$. More specifically, the position and speed estimation unit 20 may perform, for example, proportional integral control using some or all of $i_\gamma$ and $i_\delta$ provided by the coordinate transformer 12 and $v_\gamma^*$ and $v_\delta^*$ provided by the current control unit 15. The position and speed estimation unit 20 estimates the rotor position $\theta_e$ and the speed $\omega_e$ such that the axial error $(\theta_e - \theta)$ between the d-axis and the γ-axis converges toward zero. Note that various methods for estimating the rotor position $\theta_e$ and the speed $\omega_e$ have been proposed in the art. The position and speed estimation unit 20 may adopt any of those various known methods.

The inverter circuit section 2 supplies three-phase voltages corresponding to the voltage command values ($v_u^*$, $v_v^*$, and $v_w^*$) provided by the coordinate transformer 18 to the motor 1. In response, the motor 1 is driven with the power (three-phase voltages) supplied from the inverter circuit section 2 and generates rotational power.

As a result, the motor control unit 31 controls the current supplied from the inverter circuit section 2 to the motor 1 such that the d-axis current (flux weakening current) flowing through the coil 241 of the motor 1 has a magnitude corresponding to the γ-axis current command value $i_\gamma^*$ generated by the flux control unit 16. In addition, the motor control unit 31 also controls the speed of the motor 1 such that the speed of the motor 1 corresponds to the command value $\omega_2^*$ generated by the command value generation unit 22.

The step-out detection unit 21 determines whether or not a step-out (out of synchronism) has occurred in the motor 1. More specifically, the step-out detection unit 21 determines, based on the magnetic flux of the motor 1, whether or not a step-out has occurred in the motor 1. The magnetic flux of the motor 1 may be obtained based on the d-axis current, the q-axis current, the γ-axis voltage command value $v_\gamma^*$, and the δ-axis voltage command value $v_\delta^*$. When finding the amplitude of the magnetic flux of the motor 1 less than a threshold value, the step-out detection unit 21 may decide that a step-out have occurred in the motor 1. Note that the threshold value may be determined appropriately based on the amplitude of the magnetic flux generated by the permanent magnet 231 of the motor 1. Various known methods for detecting the step-out have been proposed in the art. The step-out detection unit 21 may adopt any of those various known methods.

As described above, in the electric tool 100 according to this embodiment, the motor control unit 31 of the control unit 3 has the capability of performing the flux-weaking control in the first mode. When performing the flux-weaking control, the motor control unit 31 causes a flux-weaking current to flow through the coil 241. This allows the magnetic flux applied from the permanent magnet 231 to the coil 241 to be weakened substantially.

It is known that in a motor such as a permanent magnet synchronous motor, the torque and the rotational speed ideally have such a relationship that the rotational speed is inversely proportional to the torque (i.e., a relationship that the rotational speed decreases linearly as the torque increases). The constant of proportionality of a formula representing this relationship (i.e., the gradient of a graph representing the relationship between the torque and the rotational speed) is inversely proportional to the product of the counter electromotive force constant $K_E$ and torque constant $K_T$ of the motor 1. Each of the counter electromotive force constant $K_E$ and torque constant $K_T$ is proportional to the magnetic flux applied from the permanent magnet to the coil. Thus, the constant of proportionality of the relational formula varies according to the magnetic flux (i.e., is inversely proportional to the square of the magnetic flux).

Thus, the electric tool 100 according to this embodiment may change the TN characteristic (represented by the constant of proportionality of the above-described relational formula) compared to the case of normal control, by substantially weakening the magnetic flux applied from the permanent magnet 231 to the coil 241 by flux-weaking control in the first mode. For example, the electric tool 100 may change, in the first mode, the TN characteristic from the characteristic in the case of the normal control (i.e., when the d-axis current is zero) as indicated by the line L11 in FIG. 6 to the characteristic as indicated by the line L12 in FIG. 6.

Figure 6:
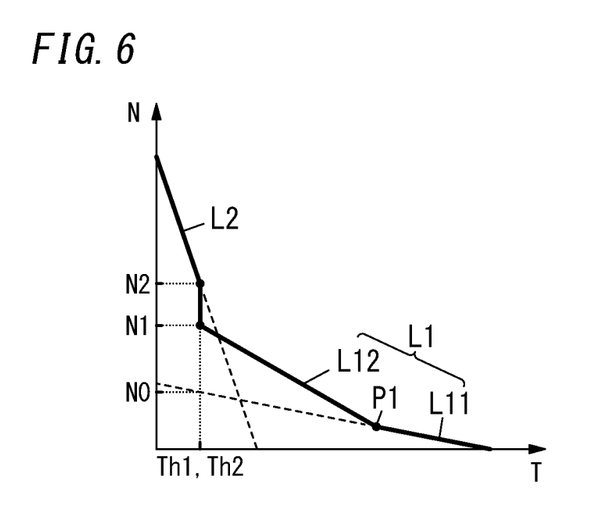
FIG. 6 shows a relationship between the output torque of an output shaft and the rotational speed of the output shaft in the electric tool.

Note that in the example illustrated in FIG. 6, when the output torque of the output shaft 5 (i.e., the result of measurement made by the load torque measuring unit 6) comes to have a value represented by an intersection P1 between the lines L11 and L12 in the first mode, the control mode is switched from the normal control to the flux-weaking control, or vice versa. Specifically, if the output torque is greater than the value at the intersection P1, the normal control is performed. On the other hand, if the output torque is less than the value at the intersection P1, the flux-weaking control is performed.

Also, in the example shown in FIG. 6, when the output torque of the output shaft 5 becomes equal to the threshold value Th1, Th2, the operation mode is switched from the first mode to the second mode, or vice versa. Specifically, if the output torque is greater than the threshold value Th1, Th2, the operation mode is switched to the first mode. On the other hand, if the output torque is less than the threshold value Th1, Th2, the operation mode is switched to the second mode.

(3) Advantages

Next, advantages of the electric tool 100 according to this embodiment will be described in comparison with an electric tool as a comparative example (hereinafter referred to as a "comparative electric tool"). In the comparative electric tool, the control unit thereof does not have the capability of performing the flux-weaking control in the first mode, which is a major difference from the electric tool 100 according to this embodiment.

FIG. 7 is a characteristic diagram showing the TN characteristic of the comparative electric tool. In FIG. 7, the line L10 indicates the characteristic of the comparative electric tool in the first mode and the line L20 indicates the characteristic of the comparative electric tool in the second mode.

FIG. 6 is a characteristic diagram showing the TN characteristic of the electric tool 100 according to this embodiment. In FIG. 6, the line L1 indicates the characteristic of the electric tool 100 in the first mode and the line L2 indicates the characteristic of the electric tool 100 in the second mode. As described above, in the electric tool 100, the line L1 representing the characteristic in the first mode includes the line L11 (representing the characteristic in the case of the normal control) and the line L12 (representing the characteristic in the case of the flux-weaking control).

As shown in FIG. 7, in the comparative electric tool, the rotational speed N of the output shaft is proportional to the output torque T of the output shaft in the entire torque region in the first mode. On the other hand, as shown in FIG. 6, the electric tool 100 according to this embodiment may increase the rotational speed of the output shaft 5 in a low torque range in the first mode (as indicated by the line L12) by performing the flux-weaking control in the first mode. This contributes to having machining work done more efficiently using the tool.

In particular, the control unit 3 suitably performs the flux-weaking control while the electric tool 100 is operating in the first mode after the operation mode has been switched by the switching mechanism 9 from the second mode (represented by the line L2) to the first mode (represented by the line L1).

For example, if the user is going to perform the work of drilling a hole with the electric tool 100, the output torque at the beginning of the machining work is zero, and therefore, the electric tool 100 starts operating in the second mode. Thereafter, as the work of drilling a hole progresses, the output torque of the output shaft 5 gradually increases from zero. When the output torque reaches the threshold value Th2, the operation mode of the electric tool 100 switches from the second mode to the first mode. In the electric tool 100, if the flux-weaking control is performed at the point in time when the operation mode is switched to the first mode, then the magnitude of variation in the rotational speed of the output shaft 5 becomes the difference between N2 and N1 shown in FIG. 6. This enables reducing the magnitude of variation in the rotational speed compared to the magnitude of variation (i.e., the difference between N2 and N0 shown in FIG. 6) in a situation where no flux-weaking control is performed at the point in time when the operation mode is switched to the first mode.

In the same way, the control unit 3 suitably performs the flux-weaking control while the electric tool 100 is operating in the first mode before the operation mode is switched by the switching mechanism 9 from the first mode (represented by the line L1) to the second mode (represented by the line L2).

For example, if the user is going to perform the work of loosening a screw with the electric tool 100, a predetermined output torque is required at the beginning of the machining work, and therefore, the electric tool 100 starts operating in the first mode. Thereafter, as the screw is loosened little by little, the output torque of the output shaft 5 gradually decreases. When the output torque reaches the threshold value Th1, the operation mode of the electric tool 100 switches from the first mode to the second mode. In the electric tool 100, if the flux-weaking control is performed at the point in time when the operation mode is switched from the first mode to the second mode, then the magnitude of variation in the rotational speed of the output shaft 5 becomes the difference between N1 and N2 shown in FIG. 6. This enables reducing the magnitude of variation in the rotational speed compared to the magnitude of variation (i.e., the difference between N0 and N2 shown in FIG. 6) in a situation where no flux-weaking control is performed at the point in time when the operation mode is switched from the first mode to the second mode.

Naturally, the control unit 3 may perform the flux-weaking control both while the electric tool 100 is operating in the first mode after the operation mode has been switched by the switching mechanism 9 from the second mode to the first mode and while the electric tool 100 is operating in the first mode before the operation mode is switched by the switching mechanism 9 from the first mode to the second mode.

(4) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure.

Next, variations of the exemplary embodiment will be enumerated one after another. Note that the variations to be described below may be adopted in combination as appropriate.

The switching mechanism 9 does not have to include the gear shift mechanism 90 and the gear shift unit 91. In one variation, the motor 1 may also be a variable field magnet motor which may vary the magnetic flux between the coil 241 and the permanent magnet 231. In that case, the switching mechanism 9 may switch the operation mode from the first mode to the second mode, or vice versa, by varying the magnetic flux between the coil 241 and the permanent magnet 231. As the variable field magnet motor, a motor which may mechanically change the relative positions of the rotor 23 (permanent magnet 231) and the stator 24 (core of the coil 241) may be used, for example. A variable field magnet motor according to a specific example includes a rotor 23 of an outer rotor type and a stator 24, and the stator 24 may be moved along the axis of the rotor 23 by an actuator.

In another variation, the electric tool 100 may further include a selector switch. The selector switch selectively enables or disables the capability of performing the flux-weaking control in accordance with an operating command entered by the user. Specifically, if the capability of performing the flux-weakening control is enabled, the TN characteristic of the electric tool 100 will be the characteristic shown in FIG. 6. On the other hand, if the capability of performing the flux-weakening control is disabled, the TN characteristic of the electric tool 100 will be the characteristic shown in FIG. 7.

In still another variation, the load torque measuring unit 6 may measure the load torque applied to the motor 1. In that case, the control unit 3 may obtain the load torque applied to the output shaft 5 based on the result of measurement made by the load torque measuring unit 6.

In yet another variation, the control unit 3 may perform the flux-weaking control in the second mode as well.

In yet another variation, the switching mechanism 9 may switch the operation mode in multiple stages (i.e., in three or more stages).

(5) Recapitulation

As can be seen from the foregoing description, an electric tool (100) according to a first aspect includes a motor (1), an operating member (70), a control unit (3), a transmission mechanism (4), and a switching mechanism (9). The motor (1) has a permanent magnet (231) and a coil (241). The operating member (70) receives an operating command entered by a user. The control unit (3) performs driving control on the motor (1) in accordance with the operating command entered through the operating member (70). The transmission mechanism (4) transmits motive power of the motor (1) to an output shaft (5). The switching mechanism (9) switches an operation mode of the electric tool (100) from a first mode to a second mode, or vice versa. In this electric tool (100), magnitude of variation in a rotational speed of the output shaft (5) in response to a change by a unit quality in an output torque of the output shaft (5) is smaller in the first mode than in the second mode. The control unit (3) has capability of performing flux weakening control in the first mode. The flux weakening control causes a flux weakening current to flow through the coil (241) to make the coil (241) generate a magnetic flux that weakens a magnetic flux of the permanent magnet (231).

This aspect contributes to having machining work done more efficiently using the tool.

An electric tool (100) according to a second aspect, which may be implemented in conjunction with the first aspect, further includes a load torque measuring unit (6). The load torque measuring unit (6) measures a load torque applied to either the motor (1) or the output shaft (5). The switching mechanism (9) switches the operation mode from the first mode to the second mode, or vice versa, by changing a reduction ratio that is a ratio of a rotational speed of the output shaft (5) to a rotational speed of the motor (1). The control unit (3) makes the switching mechanism (9) change the reduction ratio based on a result of measurement made by the load torque measuring unit (6).

This aspect enables switching the operation mode of the electric tool (100) from the first mode to the second mode, or vice versa, by making the control unit (3) change the reduction ratio of the switching mechanism (9).

In an electric tool (100) according to a third aspect, which may be implemented in conjunction with the first aspect, the motor (1) is a variable field magnet motor that may generate a variable magnetic flux between the coil (241) and the permanent magnet (231). The switching mechanism (9) switches the operation mode from the first mode to the second mode, or vice versa, by varying the magnetic flux between the coil (241) and the permanent magnet (231).

This aspect enables switching the operation mode of the electric tool (100) from the first mode to the second mode, or vice versa, by varying the magnetic flux between the coil (241) and the permanent magnet (231) of the variable field magnet motor.

In an electric tool (100) according to a fourth aspect, which may be implemented in conjunction with any one of the first to third aspects, the control unit (3) performs the flux weaking control while the electric tool (100) is operating in the first mode after the operation mode has been switched by the switching mechanism (9) from the second mode to the first mode.

According to this aspect, the flux weaking control is performed while the electric tool (100) is operating in the first mode after the operation mode has been switched from the second mode to the first mode. This may reduce the magnitude of variation in the rotational speed of the output shaft (5) when the operation mode is switched from the second mode to the first mode, compared to a situation where no flux weaking control is performed.

In an electric tool (100) according to a fifth aspect, which may be implemented in conjunction with any one of the first to fourth aspects, the control unit (3) performs the flux weaking control while the electric tool (100) is operating in the first mode before the operation mode is switched by the switching mechanism (9) from the first mode to the second mode.

According to this aspect, the flux weaking control is performed while the electric tool (100) is operating in the first mode before the operation mode is switched from the first mode to the second mode. This may reduce the magnitude of variation in the rotational speed of the output shaft (5) when the operation mode is switched from the first mode to the second mode, compared to a situation where no flux weaking control is performed.

In an electric tool (100) according to a sixth aspect, which may be implemented in conjunction with any one of the first to third aspects, the control unit (3) performs the flux weakening control while the electric tool (100) is operating in the first mode after the operation mode has been switched by the switching mechanism (9) from the second mode to the first mode and while the electric tool (100) is operating in the first mode before the operation mode is switched by the switching mechanism (9) from the first mode to the second mode.

This aspect may reduce the magnitude of variation in the rotational speed of the output shaft (5) when the operation mode is switched from the first mode to the second mode and when the operation mode is switched from the first mode to the second mode, compared to a situation where no flux weakening control is performed.

In an electric tool (100) according to a seventh aspect, which may be implemented in conjunction with any one of the first to sixth aspects, the control unit (3) changes magnitude of the flux-weakening current according to the output torque of the output shaft (5) while performing the flux weakening control.

This aspect enables changing the weakened flux in the first mode.

In an electric tool (100) according to an eighth aspect, which may be implemented in conjunction with any one of the first to seventh aspects, the control unit (3) switches, when finding a difference between a first rotational speed and a second rotational speed equal to or less than a threshold value, the operation mode from the first mode to the second mode, or vice versa. The first rotational speed is the output shaft's (5) rotational speed corresponding to a current value of the output torque in a situation where the electric tool (100) is operating in the first mode. The second rotational speed is the output shaft's (5) rotational speed corresponding to the current value of the output torque in a situation where the electric tool (100) is operating in the second mode.

According to this aspect, the operation mode of the electric tool (100) is switched in a range in which the difference between the first rotational speed and the second rotational speed is not too much. This may reduce the chances of the rotational speed of the output shaft (5) changing steeply.

An electric tool (100) according to a ninth aspect, which may be implemented in conjunction with any one of the first to eighth aspects, further includes a selector switch. The selector switch selectively enables or disables the capability of performing the flux weakening control in accordance with the operating command entered by the user.

This aspect allows the user to selectively enable or disable the capability of performing the flux weaking control according to the intended use of the electric tool (100), for example.

REFERENCE SIGNS LIST

1 Motor
231 Permanent Magnet
241 Coil
3 Control Unit
4 Transmission Mechanism
5 Output Shaft
70 Operating Member
9 Switching Mechanism
100 Electric Tool

The invention claimed is:

1. An electric tool comprising:
a motor having a permanent magnet and a coil;
an operating member configured to receive an operating command entered by a user;
a control unit configured to perform driving control on the motor in accordance with the operating command entered through the operating member;
a transmission mechanism configured to transmit motive power of the motor to an output shaft; and
a switching mechanism configured to switch an operation mode of the electric tool from a first mode to a second mode, or vice versa,
magnitude of variation in a rotational speed of the output shaft in response to a change by unit quantity in an output torque of the output shaft being smaller in the first mode than in the second mode,
the control unit having capability of performing flux weakening control in the first mode, the flux weakening control causing a flux weakening current to flow through the coil to make the coil generate a magnetic flux that weakens a magnetic flux of the permanent magnet,
the control unit being configured to, when finding a difference between a first rotational speed and a second rotational speed equal to or less than a threshold value, switch the operation mode from the first mode to the second mode, or vice versa,
the first rotational speed being the output shaft's rotational speed corresponding to a current value of the output torque in a situation where the electric tool is operating in the first mode,
the second rotational speed being the output shaft's rotational speed corresponding to the current value of the output torque in a situation where the electric tool is operating in the second mode.

2. The electric tool of claim 1, further comprising a load torque measuring unit configured to measure a load torque applied to either the motor or the output shaft, wherein
the switching mechanism is configured to switch the operation mode from the first mode to the second mode, or vice versa, by changing a reduction ratio that is a ratio of a rotational speed of the output shaft to a rotational speed of the motor, and
the control unit is configured to make the switching mechanism change the reduction ratio based on a result of measurement made by the load torque measuring unit.

3. The electric tool of claim 1, wherein
the motor is a variable field magnet motor configured to generate a variable magnetic flux between the coil and the permanent magnet, and
the switching mechanism is configured to switch the operation mode from the first mode to the second mode, or vice versa, by varying the magnetic flux between the coil and the permanent magnet.

4. The electric tool of claim 1, wherein
the control unit is configured to perform the flux weakening control while the electric tool is operating in the first mode after the operation mode has been switched by the switching mechanism from the second mode to the first mode.

5. The electric tool of claim 1, wherein
the control unit is configured to perform the flux weakening control while the electric tool is operating in the first mode before the operation mode is switched by the switching mechanism from the first mode to the second mode.

6. The electric tool of claim 1, wherein
the control unit is configured to perform the flux weakening control while the electric tool is operating in the first mode after the operation mode has been switched by the switching mechanism from the second mode to the first mode and while the electric tool is operating in the first mode before the operation mode is switched by the switching mechanism from the first mode to the second mode.

7. The electric tool of claim 1, wherein
the control unit is configured to change magnitude of the flux-weakening current according to the output torque of the output shaft while performing the flux weakening control.

8. The electric tool of claim 1, further comprising a selector switch configured to selectively enable or disable the capability of performing the flux weakening control in accordance with the operating command entered by the user.

* * * * *